United States Patent
Chappalli

(10) Patent No.: US 8,254,444 B2
(45) Date of Patent: Aug. 28, 2012

(54) SYSTEM AND METHOD FOR PHASE ADAPTIVE OCCLUSION DETECTION BASED ON MOTION VECTOR FIELD IN DIGITAL VIDEO

(75) Inventor: Mahesh Chappalli, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1490 days.

(21) Appl. No.: 11/748,377

(22) Filed: May 14, 2007

(65) Prior Publication Data
US 2008/0285650 A1    Nov. 20, 2008

(51) Int. Cl.
*H04N 7/12* (2006.01)
(52) U.S. Cl. .................................. 375/240.09
(58) Field of Classification Search ............ 375/240.12–240.16, 240.09, 240, 240.01; 382/232–238
See application file for complete search history.

(56) References Cited

U.S. PATENT DOCUMENTS

| | | | |
|---|---|---|---|
| 6,219,436 B1 | 4/2001 | De Haan et al. | |
| 6,487,313 B1 | 11/2002 | De Haan et al. | |
| 7,142,600 B1* | 11/2006 | Schonfeld et al. | 375/240.16 |
| 2002/0172287 A1* | 11/2002 | Kim | 375/240.16 |
| 2003/0194151 A1* | 10/2003 | Wang et al. | 382/300 |
| 2004/0252763 A1* | 12/2004 | Mertens | 375/240.16 |
| 2005/0163221 A1* | 7/2005 | Oka et al. | 375/240.16 |
| 2006/0083310 A1* | 4/2006 | Zhang | 375/240.16 |

OTHER PUBLICATIONS

Wittebrood et al., "Tackling Occlusion in Scan Rate Conversion Systems", IEEE THAM 18.4, Apr. 2003, pp. 344-345.
Thoma et al., "Motion Compensating Interpolation Considering Covered and Uncovered Background", Signal Processing, Image Communication I, 1989, pp. 191-212.
Castagno, et al. "A Method for Motion Adaptive Frame Rate Up-Conversion", IEEE Transactions on Circuits and Systems for Video Technology, vol. 6, No. 5, Oct. 1996, pp. 436-446.

* cited by examiner

*Primary Examiner* — Nirav B Patel

(57) ABSTRACT

Systems and methods for efficiently reformatting video data in regions of video including occlusions are disclosed. In one embodiment, the method includes determining multiple motion vectors that link/relate matching blocks of two reference frames and calculating a measure related to overlap area of the matching blocks in one or both of the reference frames with a block to be constructed in an intermediate frame. The measure related to overlap area takes into account a particular interpolation phase of the frame being constructed in relation to the two reference frames. In one embodiment, a ranking of the measure related to overlap areas is used to classify the block to be constructed according to a degree of occlusion. In another aspect the location of the matching blocks in one or both of the reference frames is used in the classification of the block to be constructed.

32 Claims, 7 Drawing Sheets

SYSTEM AND METHOD FOR PHASE ADAPTIVE OCCLUSION DETECTION BASED ON MOTION VECTOR FIELD IN DIGITAL VIDEO

BACKGROUND OF THE INVENTION

1. Field of the Invention

The invention is related to video processing. More particularly, the invention is related to detection of occlusion regions in video data.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed. Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing and transcoding are examples of processes where decoder devices create new video data based on already reconstructed video data. In addition, these motion compensation techniques can use encoded data, such as motion vectors and residual error, as well as the reconstructed video data for estimating the newly created frames.

Occlusions occurring in a video sequence present a problem to any motion estimation/compensation algorithm. Occlusions include, for example, the covering of one object (background is considered as an object) by another, and the uncovering of one object due to motion of another. Typically, the motion vectors estimated in the vicinity of occlusion areas are incorrect and using these motion vectors directly for motion compensation causes visual artifacts. One of the important steps in solving this problem is the identification of occlusion areas in a video frame and subsequent classification into covering and uncovering areas. Many approaches that have been suggested for the solution of this problem suffer from one or more drawbacks including high computational complexity, poor accuracy and localization, and insensitivity to the actual desired interpolation phase between two frames.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include more robust and efficient reformatting of video sequences in regions including occlusions.

An aspect provides a method of processing video data. The method of this aspect includes receiving a first video frame and a second video frame, where the video frames each comprise a plurality of blocks of pixels, obtaining motion information identifying a matching block in the second frame for each block in a group of blocks in the first frame, and computing a measure related to an overlap area of each of the blocks belonging to the group of blocks in the first frame with a block of pixels to be constructed in a third frame by translating matching blocks to the third frame based on the obtained motion information. The method further comprises classifying the block of pixels to be constructed in the third frame according to a degree of occlusion based at least in part on the computed overlap area measures.

Another aspect provides a system for processing video data. The system of this aspect includes a motion estimation subsystem configured to receive a first video frame and a second video frame, wherein the video frames each comprise a plurality of blocks of pixels, and the motion estimation subsystem obtains motion information identifying a matching block in the second frame for each block in a group of blocks in the first frame, and an overlap measurement subsystem configured to compute a measure related to an overlap area of each of the blocks belonging to the group of blocks in the first frame with a block of pixels to be constructed in a third frame by translating matching blocks to the third frame based on the obtained motion information. The system further includes an occlusion classification subsystem configured classify the block of pixels to be constructed in the third frame according to a degree of occlusion based at least in part on the computed overlap area measures.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, "frame" is a term that may encompass either frames or fields of a progressive video signal or frames or fields of an interlaced video signal.

Covering portions of video include objects in a first frame that are covered by an object (e.g., an object in the foreground of the covering object) in a subsequent frame. Uncovering portions of video include objects that are not in a first frame and appear (due to being uncovered by an object in the foreground or by the uncovering object itself moving from behind a foreground object) in a subsequent frame. Normal portions of video include portions that are neither covering nor uncovering.

Embodiments of processing video data including classifying portions of video as either covering, uncovering or normal will be described. The processing can be performed in a video decoder, a video transcoder or a video display system. Embodiments using motion vectors of multiple matching blocks of video data from a first frame to a second frame to classify and reconstruct blocks of video data in a frame between the first and second frames will be described. Methods of ranking measures related to overlap areas of the multiple matching blocks of video data with a block to be constructed by interpolating the multiple motion vectors and using the ranked overlap area measures in classifying the block of video data to be constructed, are also disclosed.

Figure 1:
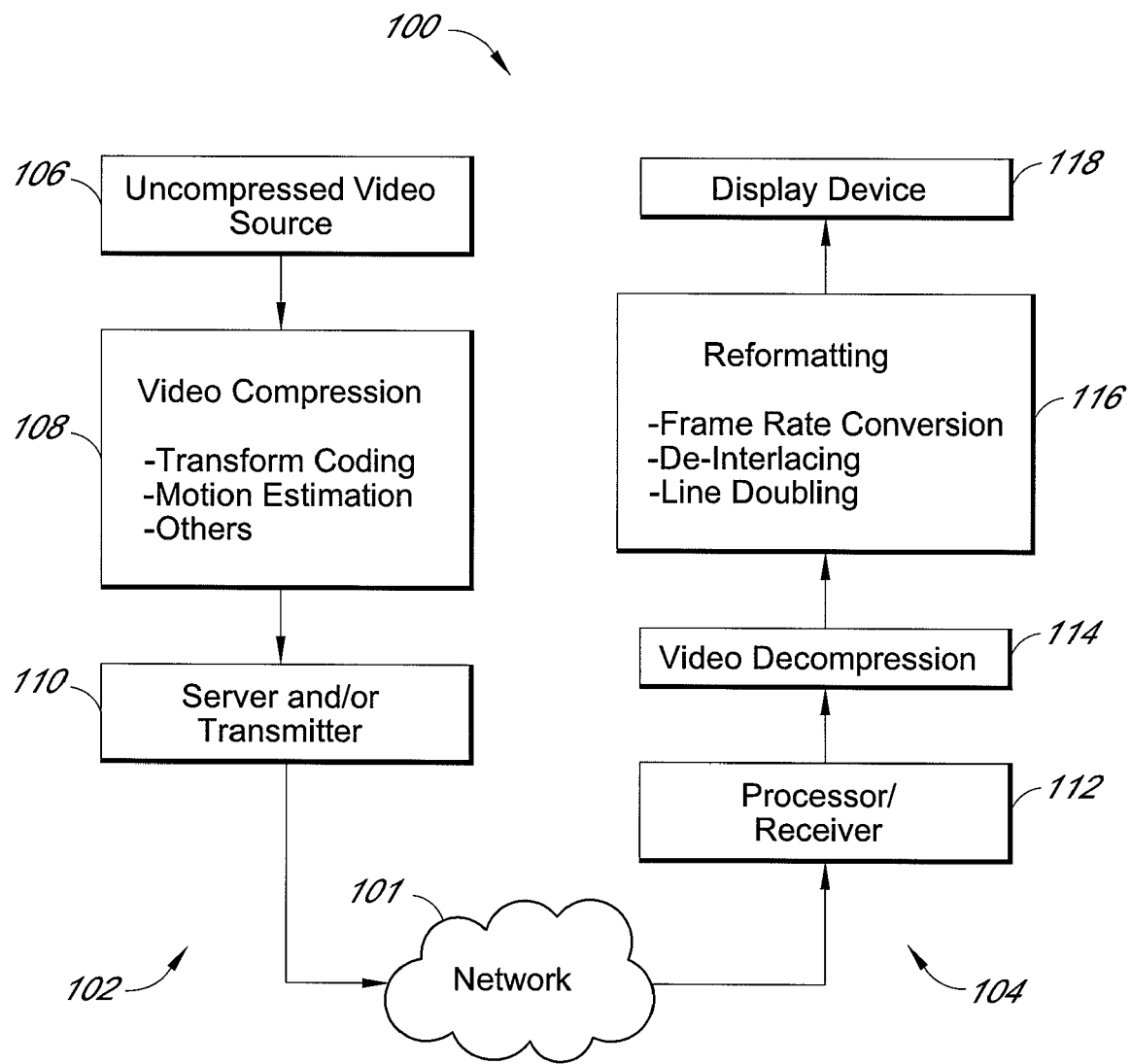
FIG. 1 is a functional block diagram of an exemplary communication system for encoding and decoding of compressed digital video data, according to one embodiment of the system and method.

FIG. 1 illustrates a functional block diagram of an exemplary communication system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112, a video decompression element 114 and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of, for example, an Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1×EV-DO or 1×EV-DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
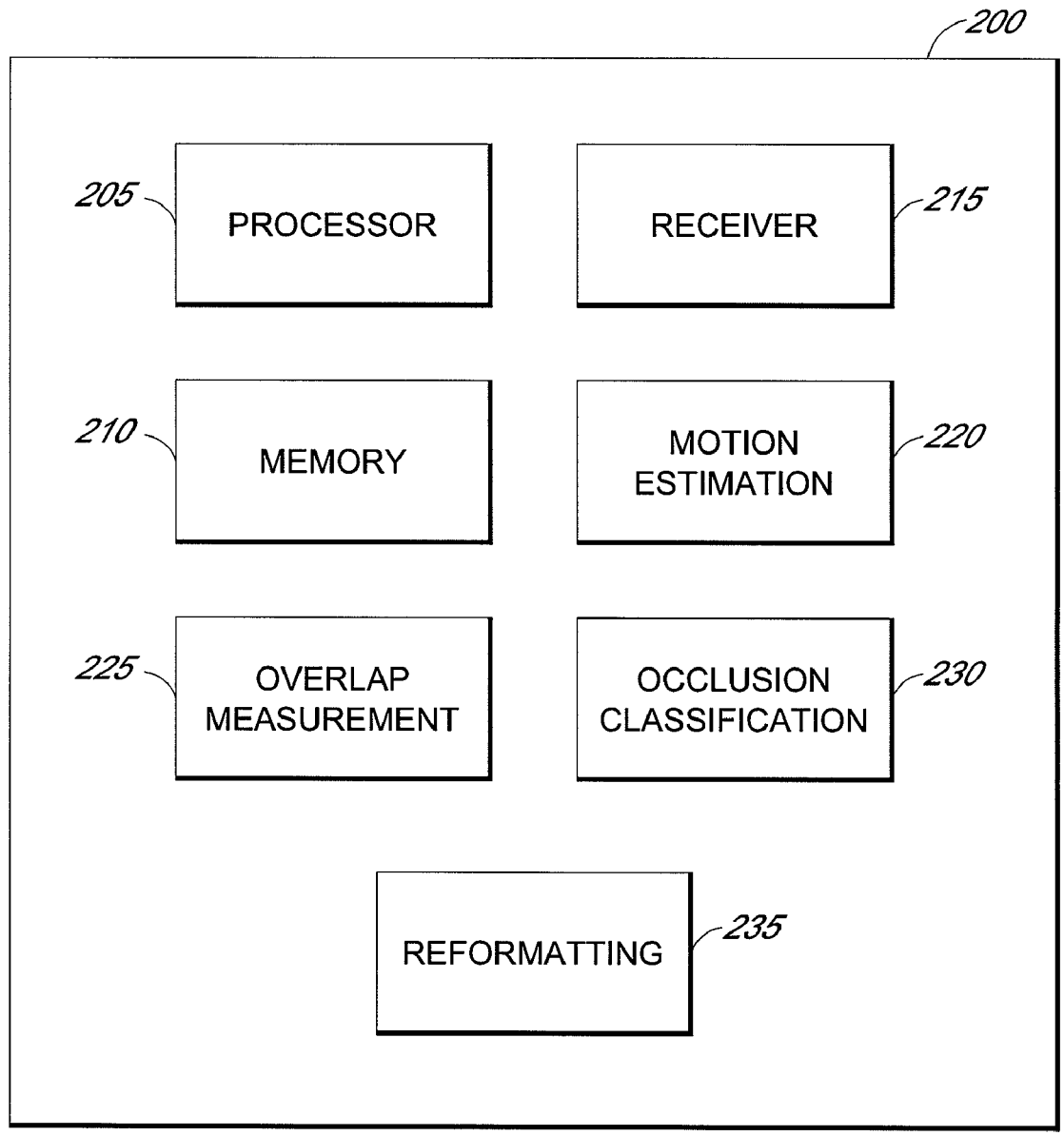
FIG. 2 is a block diagram illustrating an embodiment of a video reception system that may be used for the video reception device in a communication system such as illustrated in FIG. 1.

FIG. 2 is a block diagram illustrating an embodiment of a video reception system 200 that may be used for the video reception device 104 in a communication system such as illustrated in FIG. 1. In this embodiment, the video reception system 200 comprises a processor element 205, a memory element 210, an optional receiver element 215, a motion estimation subsystem 220, an overlap measurement subsystem 225, an occlusion classification subsystem 230, and an optional reformatting subsystem 235. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. In some embodiments, the receiver 215 receives video data over the network 101. In other embodiments, the other elements (e.g., the motion estimation subsystem 220) may receive the video data directly from the memory element 210 or one or more external memory devices including memory discs, memory cards, internet server memory, etc. The video data received over the network 101, from the memory element 210 or from external memory devices may be compressed or uncompressed video data. In the case of compressed video data stored in the memory element 210 or in the external memory devices, the compressed video data may have been created at an earlier time by an encoding device such as the video source 102 in FIG. 1.

The motion estimation subsystem 220 identifies portions of video that exhibit temporal redundancy from between two or more frames of video sequences as discussed above. The identified portions of video data containing temporal redundancy can be used to reconstruct new frames of video, such as done in frame rate conversion or de-interlacing. The portions of reference frames identified by the motion estimation subsystem 220 may be used by the reformatting subsystem 235, along with motion estimation data such as motion vectors either obtained from the encoded/compressed data or determined by the motion estimation subsystem 220, to construct other frames or portions of video data in reference to the reference frames. In one embodiment, a motion vector is used to locate a portion of an already reconstructed reference frame that is used to construct the portion of the other frame. In one aspect, a matching block of pixels in a second frame is identified by the motion estimation subsystem 220 for each block in a first frame. A residual error measurement such as a sum of absolute differences (SAD) or a mean square error (MSE) may be used to identify a matching reference portion or portions that may be used to construct other video frames using the reformatting subsystem 235. Details of actions performed by the motion estimation subsystem 220 will be discussed below in reference to the methods illustrated in FIG. 3.

The overlap measurement subsystem 225 uses motion estimation data such as motion vectors and corresponding blocks of pixels in the first and second frames to identify reference blocks that overlap with a block of pixels to be constructed by the reformatting subsystem 235. The motion vectors between the first and second frames are interpolated/extrapolated so as to translate the corresponding block from the first and/or second frame to the frame being constructed. By determining where the translated blocks of pixels are located in the frame being constructed, the overlap measurement subsystem can determine how much each translated block overlaps a block to be constructed. Details of functions performed by the overlap measurement subsystem will be discussed below in reference to the methods illustrated in FIG. 3.

The occlusion classification subsystem 230 uses the computed overlap areas of multiple translated blocks from the reference frame with a block that is to be constructed to classify the block to be constructed according to a degree of occlusion. The degree of occlusion that the block is classified as may include covering, uncovering or normal classifications. In one aspect, by using the size of the overlap areas of several blocks belonging to a neighborhood of blocks in the reference frame with the block to be constructed, the occlusion classification subsystem 230 can determine whether the block is covering, uncovering or normal (neither covering or uncovering). In another aspect, the position of the blocks in one of the reference frames can also be used in the covering/uncovering determination. Details of the actions performed by the occlusion classification subsystem 230 will be discussed below in reference to the methods illustrated in FIG. 3.

The reformatting subsystem 235 is used to reformat the reconstructed video data in order to display it on a video display device with certain video format requirements, e.g., frame rate, numbers of pixels per row and/or column, etc. The reformatting subsystem 235 can perform functions as discussed above in reference to the reformatting subsystem 116 of the video receiver 104. In one embodiment, the reformatting subsystem 235 creates one or more new frames between the reconstructed frames in order to match a frame rate of the display device. In one aspect, motion compensation techniques, similar to those discussed above, may be used to create the intermediate frames of frame rate conversion.

The reformatting subsystem 235 uses the degree of occlusion classifications as determined by the occlusion classification subsystem 230 to affect which portions of reference data are used for the reconstruction of portions of video data. For example, if an area of a video data to be constructed is determined to be covering from a previous frame to a subsequent frame, then the information may be missing (covered) in the subsequent frame and, therefore, only the video data from the previous frame is used to reconstruct the covering classified portion. Likewise, if an area of a video data to be constructed is determined to be uncovering from a previous frame to a subsequent frame, then the information may be missing (covered) in the previous frame and, therefore, only the video data from the subsequent frame is used to reconstruct the uncovering classified portion. An area of a video that is classified as normal can be constructed using data from both the previous frame and the subsequent frame. Details of actions performed by the reformatting subsystem 235 will be discussed below in reference to the methods illustrated in FIG. 3.

In some embodiments, one or more of the elements of the video reception system 200 of FIG. 2 may be rearranged and/or combined. The elements may be implemented by hardware, software, firmware, middleware, microcode or any combination thereof. Details of the actions performed by the elements of the video reception system 200 will be discussed in reference to the methods illustrated in FIG. 3 below.

Figure 3:
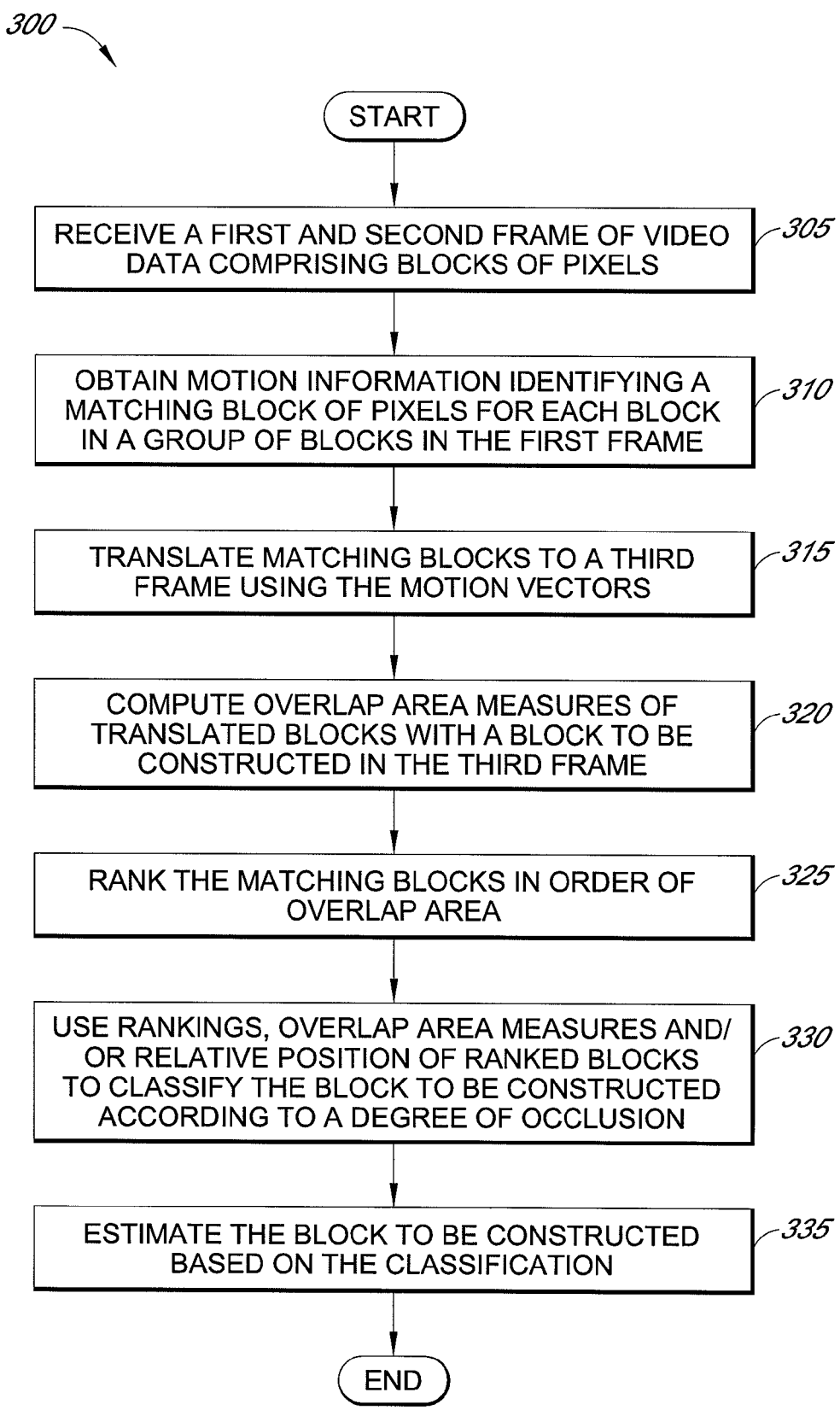
FIG. 3 is a flowchart illustrating an example of a method of reformatting received video in a system such as illustrated in FIG. 1.

FIG. 3 is a flowchart illustrating an example of a method of reformatting received video in a system such as illustrated in FIG. 1. Process 300 may be performed, for example, by a video reception device such as the video reception system 200 of FIG. 2. The process 300 identifies covering and uncovering portions of video in frames to be constructed for reformatting purposes such as frame rate conversion, de-interlacing and transcoding. The covering and uncovering classifications can be used to direct reformatting subsystems to estimate the covering and uncovering portions in ways that utilize the visible portions of video data. The process 300 will be described for a scenario where a block of pixels is constructed in an intermediate frame based on video data from a previous frame and a subsequent frame. The process 300 could be used for other scenarios, this scenario is only an example. For example, a future frame could be constructed based on video data from two previous frames, or a past frame could be constructed from video data based on two subsequent frames.

The process 300 starts at block 305, where the reception device receives a first and second frame of video data. The frames of video data comprise multiple pixels which may be divided into blocks of pixels. The blocks of pixels may be of any size and shape ranging from single pixels, to 2×1 pixels, 2×2 pixels, 2×4 pixels, 4×4 pixels, 4×8 pixels, 8×8 pixels, 8×16 pixels, 16×16 pixels or other sizes. The received frames may be obtained from a variety of sources, examples of which include compressed video, uncompressed video, and encoded video. If the frames comprise compressed video, a video processing module can decompress the frames into an uncompressed format. Similarly, encoded video frames can be decoded by a relevant video processing module. The receiver element 215 of the reception system 200 in FIG. 2 can perform the functions at the block 305.

After receiving the frames of video data at the block 305, the process 300 continues at block 310, where the video reception device obtains motion information identifying a matching block of pixels for each block of pixels in a group of blocks in the first frame. In one aspect, where compressed video frames are received at the block 305, the current frame n may be fully or partially encoded using predictive encoding from the previous frame n−1. In this aspect, the matching blocks in the previous frame may be obtained simply by using the encoded motion vectors for each block in the current frame that is predicted from the previous frame.

For blocks that are not predicted from the previous frame (and for all blocks in cases where uncompressed video is received at the block 305), block matching may be performed at the block 310 to obtain the motion information. For purposes of illustration, backward block-matching motion estimation (identifying the best match for each block in the current frame n with a block from a previous frame n−1) is considered. However, it should be noted that forward block-matching could also be performed at the block 310.

Figure 4:
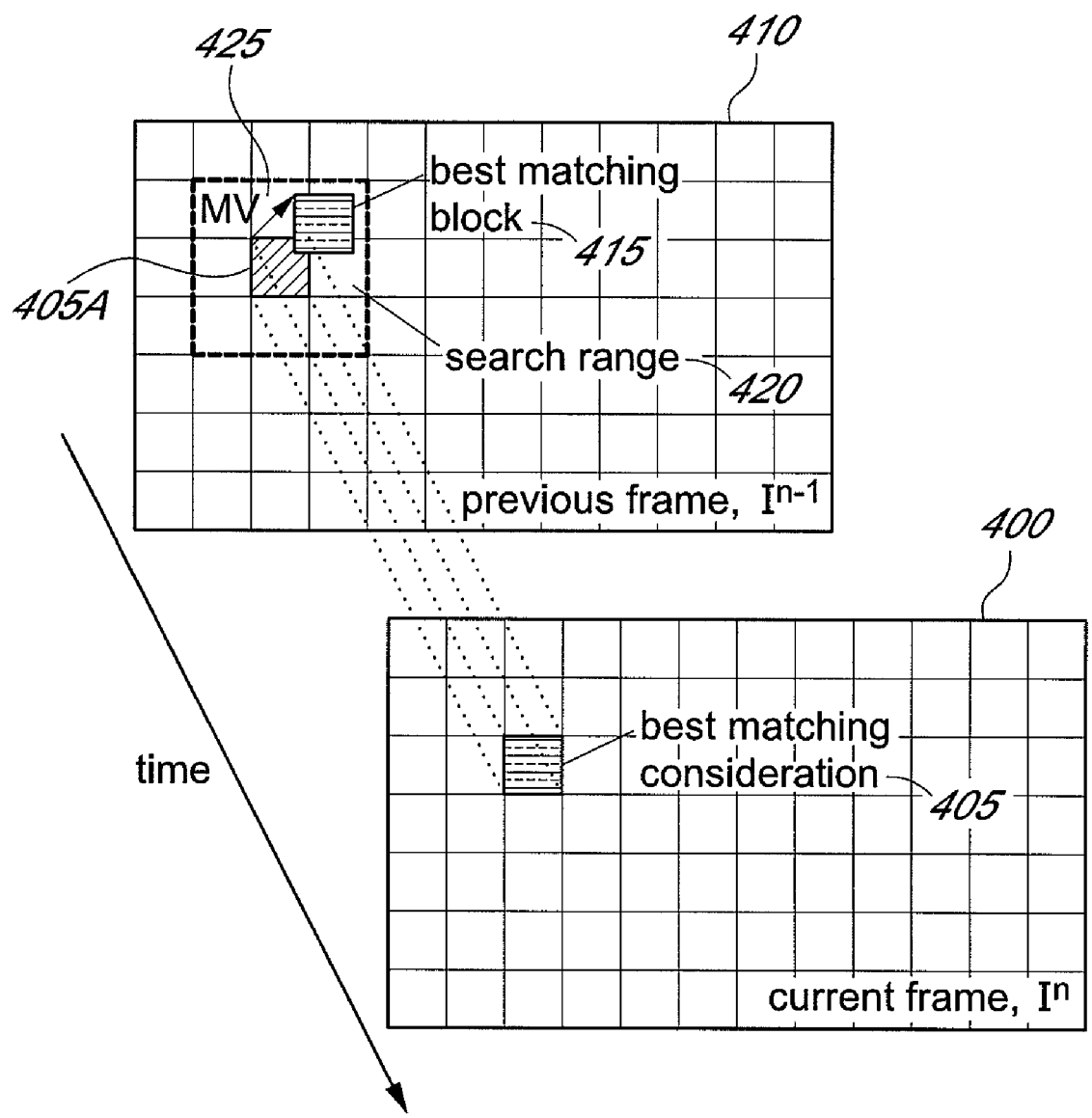
FIG. 4 is an illustration of an example of block matching that may be used in the method illustrated in FIG. 3.

FIG. 4 is an illustration of an example of block matching that may be used in the method illustrated in FIG. 3. FIG. 4 illustrates the concept of backward motion estimation. For each block 405 in the current video frame 400 (frame n), a best matching block 415 within a search area 420 in the previous video frame 410 (frame n−1) is determined. A motion vector 425, MV, indicates the position of the matching block 415 relative to the block 405 under consideration. The search area 420 may be a predetermined neighborhood of blocks surrounding a block 405A in frame 410 that is collocated (in the same vertical and horizontal location in a frame) with the block 405 of frame 400. The predetermined search area may be of any size ranging from the size of the block up to the entire frame. For blocks on the edges or corners of frames, block padding may be used. The search area may also be adaptive. A residual error measurement such as a sum of absolute differences (SAD) or a mean square error (MSE) may be used to identify a matching block. The block with the best error measurement is determined to be the matching block. The block matching at the block 310 may be performed for each block in the entire frame 400. The motion estimation subsystem 220 of the video reception system 200 in FIG. 3 can perform the functions at the block 310.

The motion information obtained at the block 310 may also include residual error measurements, pixel error variance, and rotational information. The motion information may also include more degrees of freedom other than just linear translation.

Figure 5:
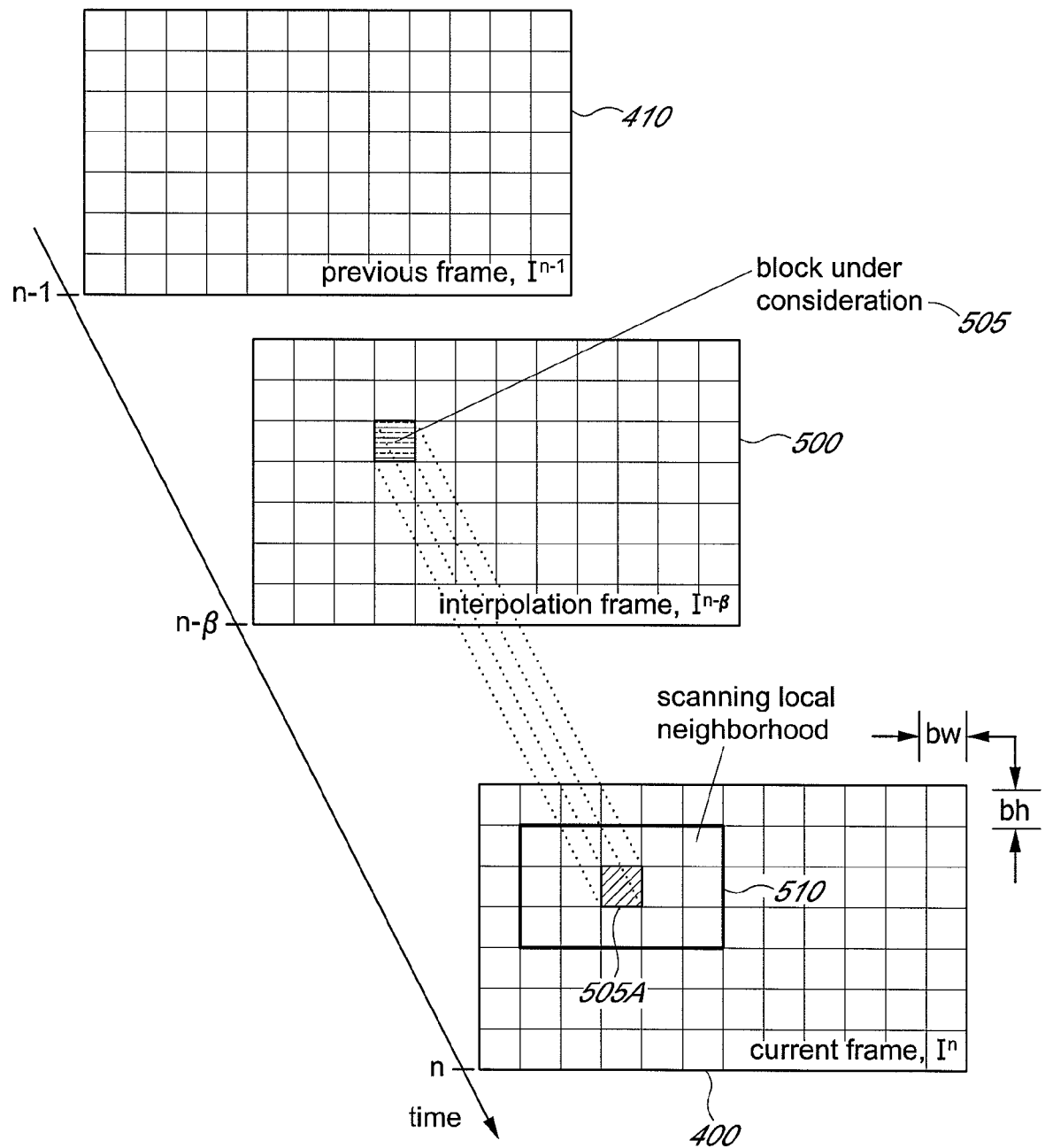
FIG. 5 is an illustration of a neighborhood group of blocks in a current frame that may be translated to compute measures of overlap areas with a block to be constructed in an intermediate frame in the method illustrated in FIG. 3.

After the matching blocks in the previous frame 410 are determined for each of the blocks in the current frame 400 at the block 310, the process 300 continues at block 315 where the blocks in frame 400 (or in the frame 410) are translated to the intermediate frame to be constructed between the frame 400 and the frame 410 using the motion information obtained at the block 310. Motion vectors of the blocks in frame 400 may be interpolated (or extrapolated in some other scenarios) to point to the intermediate frame being constructed. The said blocks are translated to the intermediate frame to be constructed in order to compute, at block 320, a measure related to overlap area of translated blocks and a block to be constructed in the intermediate frame. FIG. 5 is an illustration of a neighborhood group of blocks in a current frame (frame n/frame 400) that may be translated to compute measures of overlap areas with a block to be constructed in a third intermediate frame in the method illustrated in FIG. 3. Frame 500 is the intermediate frame being constructed between the current frame 400 and the previous frame 410. Frame 500 lies at a fractional time point β (0<β<1.0) between frames 400 and 410. In one embodiment, all of the blocks in frame 400 could be translated to the frame 500, at block 315 in the process 300, and the corresponding overlap areas of the block 505 to be constructed, could be computed at the block 320 of the process 300. However, this exhaustive form of searching for overlap areas could be computationally prohibitive. A more efficient method of limiting the overlap area computations performed at the process block 320 will now be discussed.

Referring to FIG. 5, a block-scanning neighborhood 510 is defined around block 505a that is collocated with the block 505 under consideration in the frame 500. The neighborhood 510 may be a fixed configuration of blocks similar to the search area 420 shown in FIG. 4. The size of the neighborhood 510 may also be adaptive based on the sizes of the motion vectors that were determined during the block matching at block 310. In one embodiment, the search range used in the motion estimation/block matching process (as defined by a fixed pixel width sr_x and pixel height sr_y) is used to define the size of the neighborhood 510. In this way, blocks of different sizes may be used and the size of the neighborhood 510 will correspond to the same sized area. For a given block width (e.g., in pixels) and a given block height, parameters "block_scan_w" and "block_scan_h" can be determined as shown in the following equations:

$$block\_scan\_w = sr\_x/bw \quad (1)$$

$$block\_scan\_h = sr\_y/bh \quad (2)$$

where bw is the block width, bh is the block height, the search range in the horizontal direction is from −sr_x to +sr_x and the search range in the vertical direction is from −sr_y to +sr_Y.

For each block in the frame 500 at interpolation phase n−β, the computed backward block MV field is scanned in a neighborhood 510 (with width (2*block_scan_w+1) and height (2*block_scan_h+1)) centered at the collocated block 505A in the frame 400 as the block 505 under consideration to be constructed in frame 500. This method of limiting the scanning neighborhood dimensions eliminates performing computations on blocks in frame n (frame 400) that have a very small chance of ever having a non-zero overlap area with block 505 in frame 500 due to the limited search range employed in the motion estimation process. The overlap areas resulting from translating the blocks in frame 400 that were determined for each of the blocks in the neighborhood 510 of frame 400 will be used to determine the covering/uncovering status of the block 505 to be constructed in the frame 500. Details of methods of computing the overlap area will be discussed below in reference to FIG. 7. The overlap measurement subsystem 225 of the reception system 200 in FIG. 2 may perform the functions at the blocks 315 and 320 in the process 300.

Returning to FIG. 3, after the measures related to overlap area are computed at the block 320, the process 300 continues at the block 325, where the overlap areas of all the blocks belonging to neighborhood 510 that were considered at blocks 315 and 320 are ranked in order of overlap area. In one aspect, the blocks belonging to the neighborhood 510 of the block 505 are ranked in descending order depending on the overlap area measure (note that blocks without any overlap have an overlap area of zero). Overlap areas less than a certain threshold, T, may be set to zero. Thresholding the overlap areas in this way may add robustness to the process 300 since it may eliminate spurious or incorrect matching blocks. The threshold, T, may be in a range from about 1% overlap to about 16% overlap. In one aspect, the threshold T is determined based on the temporal distance α=1−β that the frame 500 being constructed is separated from the frame 410 containing the matching macroblocks. This is done to account for the uncertainty added by the increased time. For example, the threshold T may be set to 1% for α=0.2 or less, and may be equal to 16% for α=0.8 or greater. The threshold T may be set by a linear equation as shown below for other values of α:

$$T = 25*α − 4(\%), \text{ for } 0.2 < α < 0.8 \quad (3)$$

Other methods of setting the threshold T may also be used. The occlusion classification subsystem 230 of the reception system 200 in FIG. 2 may perform the functions at the block 325.

After ranking the overlap areas at the block 325, the process 300 continues at block 330, where the ranked overlap areas are used to classify a block to be constructed according to a degree of occlusion. In one aspect, the block to be constructed is classified to be either covering from the previous frame 410 to the current frame 400, uncovering or normal. In addition to using the rankings of the overlap areas, the positions of the blocks in the neighborhood 510 in frame 400 are also considered. The block 505 under consideration is classified into one the categories NORMAL, COVERING, and UNCOVERING. An example of criteria that may be used at the block 330 for classifying blocks under consideration for construction are listed in Table 1.

TABLE 1

| Classification | Criteria |
|---|---|
| NORMAL | 1) if there exists only one block in the local neighborhood 510 with a non-zero overlap area OR<br>2) if the blocks with the best two overlap area measures in the local neighborhood are separated by a distance less than another pre-determined threshold, D = (dx, dy) |
| COVERING (using backward block matching) | if none of the blocks in the local neighborhood 510 have a non-zero overlap area |
| UNCOVERING (using backward block matching) | if the blocks with the best two overlap area measures are separated by a distance greater than or equal to the pre-determined threshold, D = (dx, dy) |

Figure 6:
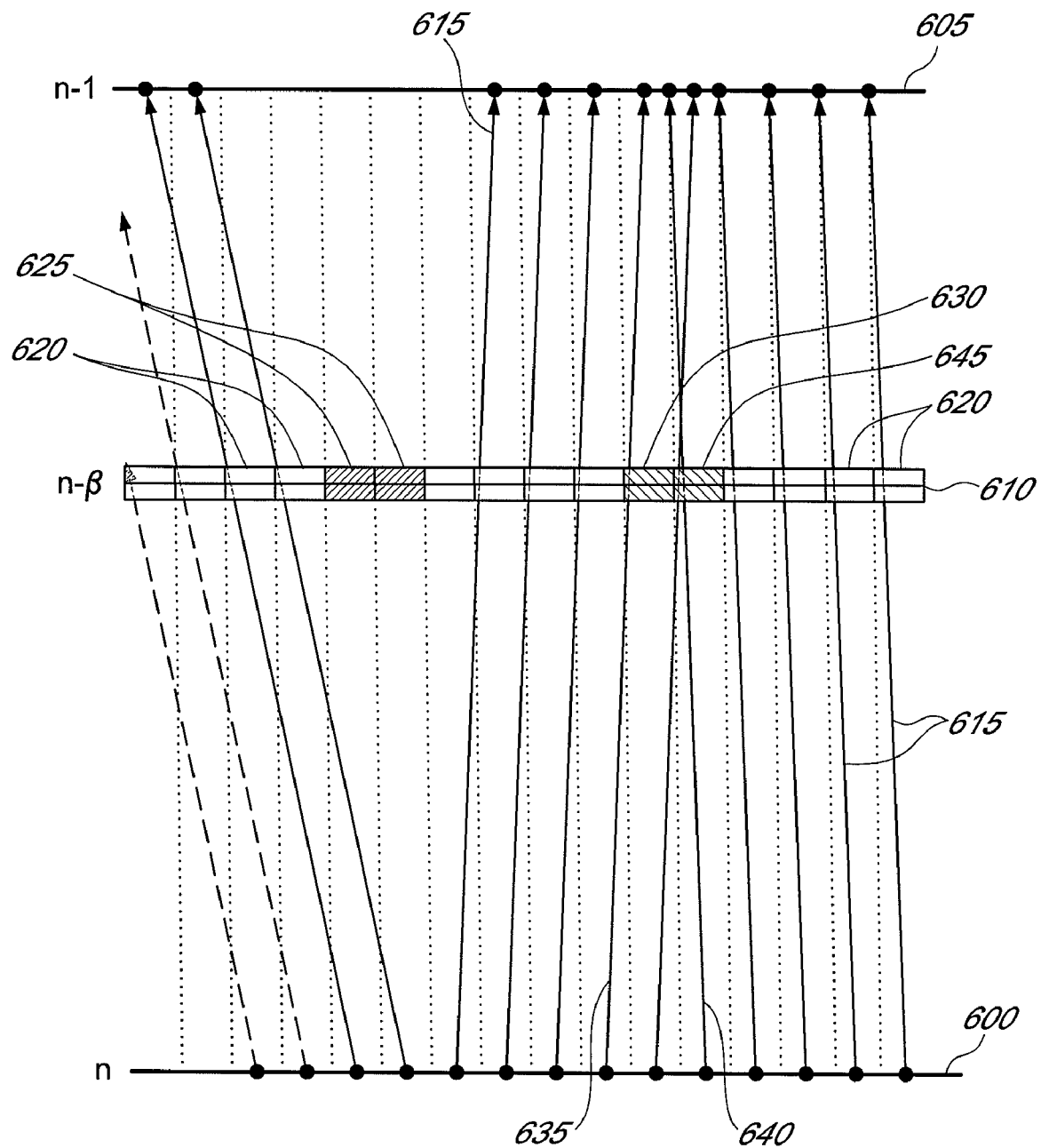
FIG. 6 is a graphic illustration of examples of covering and uncovering block identification that may be used in the method illustrated in FIG. 3.

FIG. 6 is a graphic illustration of examples of covering and uncovering block identification that may be used in the method illustrated in FIG. 3. FIG. 6 is a simplified two dimensional (a horizontal displacement dimension and a time dimension) illustration that is used to demonstrate the classification process performed at the block 330. A current frame 600 labeled frame "n" contains multiple blocks of pixels. Matching blocks have been identified (in the block 310 of the process 300) in a previous frame 605, labeled frame "n−1", and motion vectors 615 show the relative locations between the blocks in the frame 600 and the matching blocks in the frame 605.

An intermediate frame 610 at time point "n−β" is being constructed between the frames 600 and 605. The frame 610 also comprises multiple blocks of pixels to be constructed. The blocks 620 are classified as normal since only one or two motion vectors 615 pass through these blocks 620 and either there is only one block with a non-zero overlap area when translated by its motion vector or the blocks corresponding to the best two overlap area measures with each block 620 are adjacent to each other in the frame 600. Since the blocks are adjacent to each other, they satisfy the criteria listed in Table 1 for a distance threshold D(dx,dy)=(1,1), for example, where other distance thresholds could be used. The dx and dy distances are horizontal and vertical displacements in a two dimensional video frame. Only the horizontal dimension is shown in the frames 600, 605 and 610 of FIG. 6.

Examples of blocks classified as covering are blocks 625. The blocks 625 are classified as covering since there are no motion vectors that result in blocks of frame 600 overlapping the blocks 625 when they are translated by their respective motion vectors.

An example of a block classified as uncovering is block 630. The block 630 is classified as uncovering since the blocks of the frame 600 that result in the best overlap measures of the block 630 are separated by a distance greater than the threshold distance D(dx,dy)=(1,1). The blocks corresponding to the motion vectors 635 and 640 result in the two best overlap measures for block 630 in this illustration. Details of how to calculate the overlap area measures are not critical to this illustration. These details are discussed below in reference to FIG. 7. Since the motion vectors 635 and 640 correspond to blocks in the frame 600 that are separated by a distance of two blocks in frame 600, the criteria listed in Table 1 for uncovering blocks is satisfied and the block 630 is classified as uncovering for a threshold D(dx, d)=(1, 1). In this example, block 645 in the frame 610 may also be classified as uncovering at the block 330 of the process 300. The occlusion classifications subsystem 230 of the video reception system 200 in FIG. 2 can perform the functions at the block 330.

In another aspect, the matching blocks determined at the block 310 in the process 300 could be predicted in the current frame 600 from the previous frame 605. In this aspect the motion vectors 615 would point from the frame 605 to the frame 610 in FIG. 6. If this forward block matching is done, the criteria for covering and uncovering are reversed as shown in Table 2.

TABLE 2

| Classification | Criteria |
|---|---|
| NORMAL | 1) if there exists only one block in the local neighborhood (defined similar to above, but existing in frame 605) with a non-zero overlap area OR<br>2) if the blocks with the best two overlap area measures in the local neighborhood are separated by a distance less than another pre-determined threshold, D = (dx, dy) |
| COVERING* (using forward block matching) | if the blocks with the best two overlap area measures (adjacent blocks can be ignored) are separated by a distance greater than or equal to the pre-determined threshold, D = (dx, dy) |
| UNCOVERING* (using forward block matching) | if none of the blocks in the local neighborhood have a non-zero overlap area |

*Note, however, that the definition of covering and uncovering remain the same as in Table 1 with covering referring to the covering/disappearance of an object/part of an object in frame 600 that is visible in frame 605 and uncovering referring to the appearance of an object/part of an object in frame 600 that is not visible in frame 605.

After each of the blocks in the frame to be constructed are classified as normal, covering or uncovering at the block 330, the process 300 continues at block 335 where the classified blocks are estimated based on the blocks in the first and/or the second frame, depending on their classification. In areas classified as "NORMAL", the pixel value $I^{n-\beta}$ at a generic location (x, y) in the intermediate frame at interpolation phase n−β may be computed at the block 335, for a given backward motion vector (dx, dy), as:

$$I^{n-\beta}(x,y) = \beta \cdot I^{n-1}(x + \alpha \cdot dx, y + \alpha \cdot dy) + \alpha \cdot I^n(x - \beta \cdot dx, y - \beta \cdot dy) \quad (4)$$

The pixel values "I" may be one or more of luminance, chrominance, colors (e.g., red, green and blue), etc. In equation (4), the pixel values $I^{n-\beta}$ of NORMAL blocks in the intermediate frame are predicted from both the current frame pixel value $I^n$ and the previous frame pixel value $I^{n-1}$ using weightings that are additive inverses of the temporal distances (α and β, where α=1−β) between the reference frames in the frame sequence and the frame being constructed. The pixels in the reference frames are located using a motion vector with displacements (dx, dy) where the fractional α and β terms perform the interpolation of the motion vector.

In areas classified as "COVERING" from the previous frame "n−1" to the current frame "n", the pixel information for objects such as background may not be present in the current frame "n", and employing the equation (4) could result in visual artifacts. Hence, only information from frame "n−1" is used in computing the desired pixel value at the block 335 as indicated by the following equation:

$$I^{n-\beta}(x,y) = I^{n-1}(x + \alpha \cdot dx, y + \alpha \cdot dy) \quad (5)$$

where the α term (the temporal distance between the previous frame and the intermediate frame, 0<α<1) interpolates the backward motion vector (dx, dy) to point from the previous frame "n−1" to the intermediate frame.

In areas classified as "UNCOVERING", complete information about the revealed object such as background may only be present in the current frame "n". Consequently, only information from frame "n" is used in estimating the pixel value at the block 335 as indicated by the following equation:

$$I^{n-\beta}(x,y) = I^n(x - \beta \cdot dx, y - \beta \cdot dy) \quad (6)$$

where the β term (the temporal distance between the current frame and the intermediate frame, 0<β<1) interpolates the motion vector (dx, dy) to point from the current frame "n" to the intermediate frame.

In some aspects, one or more of α·dx, α·dy, β·dx, and β·dy displacements may contain non-integer components, thereby pointing to areas between pixels. In these cases, the data in frames $I^n$ and $I^{n-1}$ being present only at integer pixel locations, any of various interpolation strategies (e.g., spline, nearest-neighbor, bilinear, bicubic, polyphase) can be used in evaluating the above mentioned equations for fractional pixel locations.

In some aspects, the pixel values determined at the block 335 (for a block of pixels being constructed) may be a combination of more than one motion vector. For example, matching blocks may be determined in two previous frames or in two subsequent frames and the two associated motion vectors and pixel values can be combined to yield the estimated pixel value of the frame being constructed. In another example, the final pixel value can be obtained as a combination of pixel values determined using neighboring motion vectors.

In some aspects, soft switching between the equations for the three types of classified areas can be employed to avoid visible artifacts due to hard switching and yield possibly better visual output. In some aspects, the detection logic employed at the block 330 in the process 300 uses thresholds to classify the video frame into three categories. The detection logic can be modified to smoothly transition between these categories by employing gray (and not binary) decisions, known as soft switching, which can be reflected into the above equations (4-6). An example of soft switching that may be used at the block 330 to affect the reformatting at the block 335 will now be discussed.

As discussed above, by considering factors such as, for example, overlap area measures of multiple blocks, rankings of the blocks using overlap area measures, and the relative positions of the ranked blocks, the block to be constructed in the third frame can be classified as covering, uncovering and normal. This classification process may involve the use of certain thresholds. For example, the criterion for classification as covering may be that the overlap area be zero. This implies that a block with an overlap area of 1% could be handled/processed very differently (different motion compensation equations) from a block with an overlap area of zero. This type of hard-switching may cause visual artifacts. In order to possibly avoid this, a gray or soft-switching decision may be used. Again, referring to the example considered above, a block may be classified as covering when the overlap area is zero, but it would get classified as normal only if the overlap area exceeds a certain threshold, such as, for example, 20%. Any overlap in between zero and 20% would then have a gray or soft decision and the outputs from the equation for handling covering areas and the equation for handling normal areas could be appropriately mixed. This soft-switching process can be similarly applied to uncovering areas.

As an example, assuming that a value of −1 represents classification of a block as covering, a value of zero represents the classification as normal, and a value of +1 represents the classification as uncovering, the soft-switching process produces a fractional value, say φ, in the range [−1, 1] (whereas the hard-switching process would only have one of three values of −1, 0, or 1). Let "$I_c$" represent the pixel value output based on a method for handling covering areas (e.g., using equation (5) above), let "$I_n$" represent the pixel value output based on a method for handling normal areas (e.g., using equation (4) above), and let "$I_u$" represent the pixel value output for handling uncovering areas (e.g., using equation (6) above). Then the soft-switching output "$I_s$" would be as follows:

$$I_s=[-\min(0,\phi) \cdot I_c]+[\min(1-\phi,1+\phi) \cdot I_n]+[\max(0,\phi) \cdot I_u] \quad (7)$$

Figure 7:
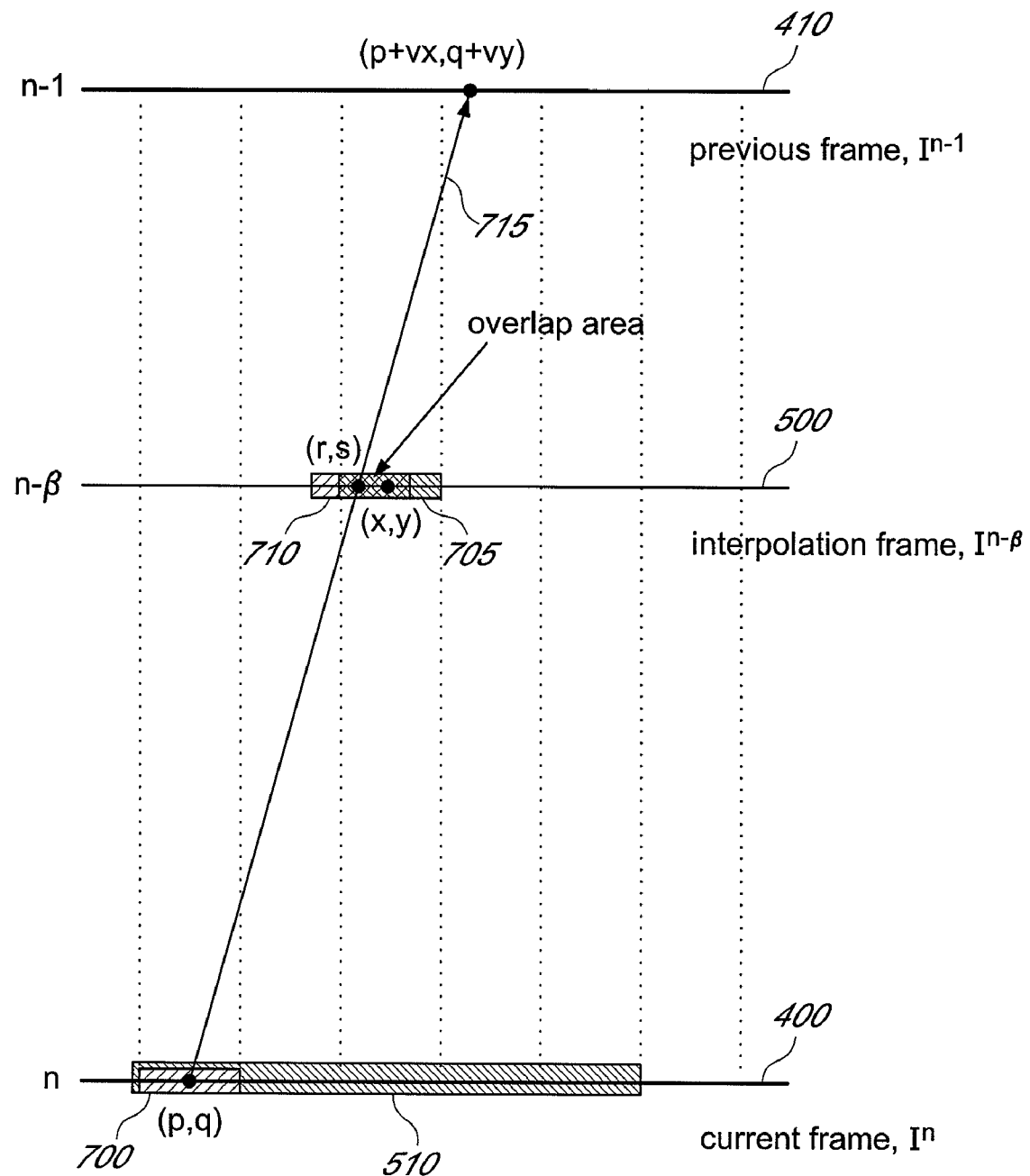
FIG. 7 is a graphic illustration of an example of overlap area computation that may be used in the method illustrated in FIG. 3.

FIG. 7 is a graphic illustration of an example of overlap area computation that may be used at the block 320 in the process 300 illustrated in FIG. 3. As discussed above, each block belonging to the local neighborhood 510 in the current frame 400 is translated by its interpolated MV to overlap with the intermediate frame 500 being constructed. The overlap area, or alternatively, an indicator of the overlap area, between the block under construction and the translated block at interpolation phase n−β is computed. Block 705 to be constructed is centered at pixel location (x, y) at interpolation time point n−β in the intermediate frame 500 being constructed. A block 700 is centered at coordinate (p, q) and is in the scanning local neighborhood 510 of the current frame 400. A backward motion vector 715 with displacements (vx, vy) (such as could be determined at the block 310 of the process 300 discussed above) points to a matching block in frame "n−1" from block 700 in frame "n". The overlap area can then be estimated between block 705 and the translated block 710 centered at coordinate (r, s) where $$(r,s)=(p,q)+(\beta \cdot vx, \beta \cdot vy) \quad (8)$$

The exact overlap area need not be necessarily computed. Any indicator of overlap area can alternatively be used. Some examples of overlap area indicator metrics are the Euclidean distance as calculated by the following equation:

$$D=\sqrt{(x-r)^2+(y-s)^2}, \quad (9)$$

or alternatively a City-Block style distance as calculated by the following equation $$D=|x-r|+|y-s| \quad (10)$$

Equations (9) and (10) each compute a distance between the centers (or any other corresponding positions) of the two blocks 705 and 710 at positions (x, y) and (r, s), respectively, that the overlap area is to be determined for. The overlap area for a distance D=0 corresponds to 100% and the overlap area for any distance D greater than the width of the block 705 is zero. The overlap areas may be ranked from the largest (100% overlap) corresponding to D=0 to the smallest (0% overlap) corresponding to any D greater than the width of the block. Other measures related to overlap area known to skilled technologists may also be used.

Another embodiment is a system for processing video data. The system includes means for receiving a first video frame and a second video frame, wherein the video frames comprise a plurality of blocks of pixels. The system further includes means for obtaining motion information identifying a matching block in the second frame for each block in a group of blocks in the first frame, and means for computing a measure related to an overlap area of each of the blocks belonging to the group of blocks in the first frame with a block of pixels to be constructed in a third frame by translating matching blocks to the third frame based on the obtained motion information. The system further includes means for classifying the block of pixels to be constructed in the third frame according to a degree of occlusion based at least in part on the computed overlap area measures. With reference to FIG. 2, aspects of this embodiment include where the means for receiving is the receiver 215, where the means for obtaining the motion information is the motion estimation subsystem 220, where the means for computing the overlap area measure is the overlap measurement subsystem 225, and where the means for classifying the block of pixels is the occlusion classification subsystem 230.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of processing video data, comprising:
receiving a first video frame and a second video frame, wherein the first video frame and the second video frame each comprise a plurality of blocks of pixels;
obtaining motion information identifying a matching block in the second frame for each block in a group of blocks in the first frame, wherein the group of blocks includes one or more of the pluarlity of blocks of pixels;
computing a measure related to an overlap area of each of the block belonging to the group of blocks in the first frame with a block of pixels to be constructed in a third frame by translating the matching block to the third frame based on the obtained motion information;
classifying the block of pixels to be constructed in the third frame according to a degree of occlusion based at least in part on the measure related to the overlap area; and
wherein computing the measure includes:
setting the measure related to the overlap area to a value indicating no overlap when the measure related to the overlap area indicates the overlap area is less than a threshold.

2. The method of claim 1, further comprising classifying the block of pixels to be constructed in the third frame to be one of normal, covering and uncovering.

3. The method of claim 1, wherein classifying the block of pixels to be constructed in the third frame according to the degree of occlusion comprises using soft decision regions.

4. The method of claim 1, wherein the group of blocks in the first frame comprises a neighborhood of blocks surrounding a block located at the same horizontal and vertical frame location as the block to be constructed in the third frame.

5. The method of claim 1, wherein obtaining the motion information comprises determining the matching block in the second frame based on residual error measurements and determining a corresponding motion vector for each block in the group of blocks in the first frame.

6. The method of claim 1, wherein the obtained motion information comprises motion vectors encoded in the received first or second video frames.

7. The method of claim 1, further comprising:
ranking the block of pixels belonging to the group of blocks in order of the computed overlap area measure; and
classifying the block of pixels to be constructed in the third frame according to the degree of occlusion based at least in part on the ranking.

8. The method of claim 7, further comprising classifying the block of pixels to be constructed in the third frame as normal when the largest ranked overlap area measure indicates the overlap area is greater than a threshold.

9. The method of claim 7, further comprising classifying the block of pixels to be constructed in the third frame as normal when the two largest ranked overlap area measures correspond to blocks in the first frame separated by a distance is less than a threshold.

10. The method of claim 2, wherein when the block of pixels to be constructed in the third frame is classified as normal, the method further comprises estimating pixel values of the block of pixels to be constructed in the third frame based on pixels in the first and the second frame.

11. The method of claim 7, wherein the second frame is located prior to the first frame in a video sequence and the third frame is located between the first and second frames.

12. The method of claim 11, further comprising classifying the block of pixels to be constructed in the third frame as uncovering from the second frame to the first frame when the two largest ranked overlap area indicators correspond to blocks in the first frame separated by a distance greater than a second threshold.

13. The method of claim 12, wherein when the block of pixels to be constructed in the third frame is classified as uncovering from the second frame to the first frame, the method further comprises estimating pixel values of the block of pixels to be constructed in the third frame based only on pixels in the first frame.

14. The method of claim 11, further comprising classifying the block of pixels to be constructed in the third frame as covering from the second frame to the first frame when none of the measures of overlap area exceeds a threshold.

15. The method of claim 14, wherein when the block of pixels to be constructed in the third frame is classified as covering from the second frame to the first frame, the method further comprises estimating pixel values of the block of pixels to be constructed in the third frame based only on pixels in the second frame.

16. The method of claim 14, wherein setting the measure related to the overlap area includes setting the measure related to the overlap area to zero.

17. A method of processing video data, comprising:
receiving a first video frame and a second video frame, wherein the first video frame and the second video frame each comprise a plurality of blocks of pixels with each block having a position;
obtaining motion information identifying a matching block in the second frame for each block in a group of blocks in the first frame, wherein the group of blocks includes one or more of the plurality of blocks of pixels;
computing a measure related to an overlap area of each of the block belonging to the group of blocks in the first frame with a block of pixels to be constructed in a third frame by translating the matching block to the third frame based on the obtained motion information;
classifying the block of pixels to be constructed in the third frame according to a degree of occlusion based at least in part on the measure related to the overlap area and the position of each of the blocks; and
wherein computing the measure includes:
setting the measure related to the overlap area to a value indicating no overlap when the measure related to the overlap area indicates the overlap area is less than a threshold.

18. The method of claim 17, wherein classifying the block of pixels includes classifying the block of pixels to be constructed in the third frame to be one of normal, covering and uncovering.

19. The method of claim 17, wherein classifying the block of pixels includes using soft decision regions.

20. The method of claim 17, wherein the group of blocks in the first frame comprises a neighborhood of blocks surrounding a block located at the same horizontal and vertical frame location as the block to be constructed in the third frame.

21. The method of claim 17, wherein obtaining the motion information includes:
determining the matching block in the second frame based on residual error measurements, and
determining a corresponding motion vector for each block in the group of blocks in the first frame.

22. The method of claim 17, wherein the obtained motion information comprises motion vectors encoded in the received first or second video frames.

23. The method of claim 17, further comprising:
ranking the block of pixels belonging to the group of blocks in order of the computed overlap area measure, and
classifying the block of pixels to be constructed in the third frame according to the degree of occlusion based at least in part on the ranking.

24. The method of claim 23, wherein classifying the block of pixels includes classifying the block of pixels to be constructed in the third frame as normal when the largest ranked overlap area is greater than a threshold.

25. The method of claim 23, wherein classifying the block of pixels includes classifying the block of pixels to be constructed in the third frame as normal when the two largest ranked overlap area indicators correspond to blocks in the first frame separated by a distance less than a second threshold.

26. The method of claim 18, further comprising estimating pixel values of the block of pixels to be constructed in the third frame based on pixels in the first and the second frame when the block of pixels to be constructed in the third frame is classified as normal.

27. The method of claim 23, wherein the second frame is located prior to the first frame in a video sequence and the third frame is located between the first and second frames.

28. The method of claim 27, wherein classifying the block of pixels includes classifying the block of pixels to be constructed in the third frame as uncovering from the second frame to the first frame when the two largest ranked overlap area indicators correspond to blocks in the first frame separated by a distance greater than a second threshold.

29. The method of claim 28, further comprising estimating pixel values of the block of pixels to be constructed in the third frame based only on pixels in the first frame when the block of pixels to be constructed in the third frame is classified as uncovering from the second frame to the first frame.

30. The method of claim 27, wherein classifying the block of pixels includes classifying the block of pixels to be constructed in the third frame as covering from the second frame to the first frame when none of the measures of overlap area exceeds a threshold.

31. The method of claim 30, further comprising estimating pixel values of the block of pixels to be constructed in the third frame based only on pixels in the second frame when the block of pixels to be constructed in the third frame is classified as covering from the second frame to the first frame.

32. The method of claim 30, wherein setting the measure related to the overlap area includes setting the measure related to the overlap area to zero.

* * * * *